D. C. MARTIN.
FEED BAG.
APPLICATION FILED APR. 1, 1908.
905,549.
Patented Dec. 1, 1908.
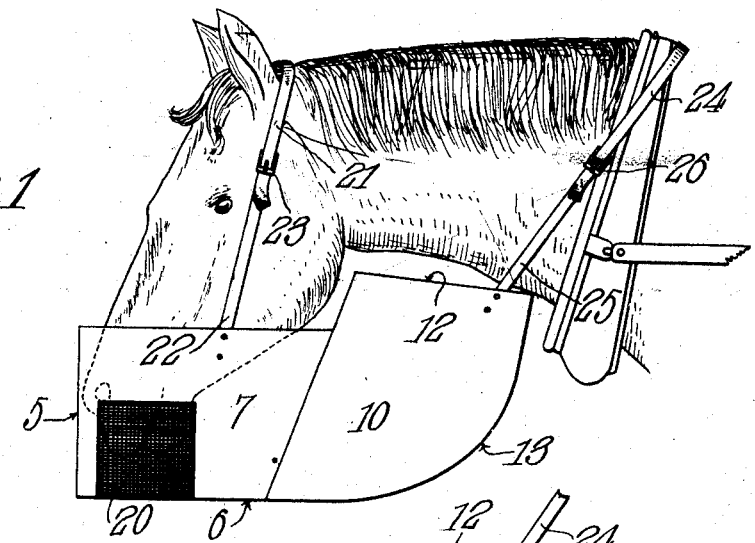
Fig. 1.
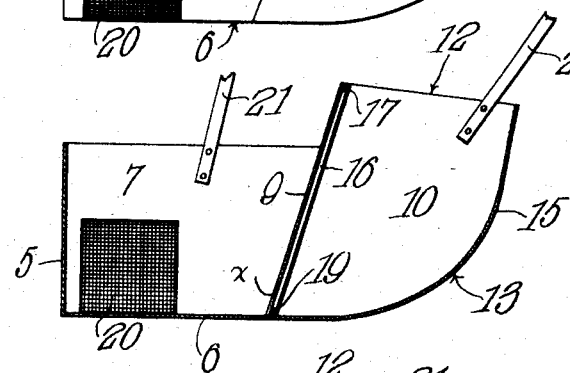
Fig. 3.
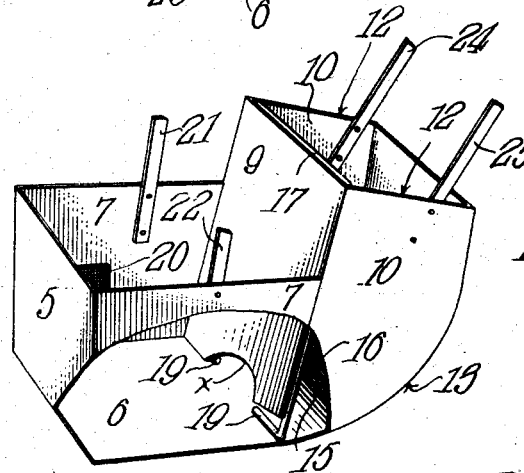
Fig. 2.
Witnesses
Chas. C. Richardson.
M. J. Miller
Inventor
Daniel C. Martin,
Attorneys.
THE NORRIS PETERS CO., WASHINGTON, D. C.

UNITED STATES PATENT OFFICE.

DANIEL C. MARTIN, OF ST. LOUIS, MISSOURI.

FEED-BAG.

No. 905,549. Specification of Letters Patent. Patented Dec. 1, 1908.

Application filed April 1, 1908. Serial No. 424,647.

*To all whom it may concern:*

Be it known that I, DANIEL C. MARTIN, a citizen of the United States, residing at St. Louis, in the county of St. Louis City, State of Missouri, have invented certain new and useful Improvements in Feed-Bags; and I do hereby declare the following to be a full, clear, and exact description of the invention, such as will enable others skilled in the art to which it appertains to make and use the same.

This invention relates to certain new and useful improvements in feed bags, the object being, to provide a feed bag having a forward ventilated manger forming receptacle, from which the animal eats, and a connected bin-forming receptacle, within which the feed is held, and from which it gravitates into the feeding compartment, the bin or reservoir forming compartment being held below the horse's neck.

In the accompanying drawings, I have shown in Figure 1 a side view of the bag embodying my invention as secured to a feeding horse, Fig. 2 is a perspective view of the bag with portions broken away, and Fig. 3 is a central sectional view.

In carrying out the purpose of this invention, I construct a feed bag made of flexible material and comprising the forward section 5 which is continued to form the bottom 6 which bottom 6 is approximately rectangular and is secured to the side portions 7, 7. Extending from the bottom portion 6 and the sides 7 is a partition forming member 9 which is extended beyond the upper edges of said sides 7, as disclosed in the drawings. Extending from the vertical edges of the partition forming section 9 which is also of flexible material are the two similar sides 10, 10 which are approximately triangular in outline, the upper edges 12, however sloping slightly downward while the bottom forming edge of these rear side forming members is curved as is shown at 13. The bottom section 6 is continued to form the sloping bottom 15 of the rear compartment, as embraced in my invention, the bottom 15 being suitably secured to the sides 10, 10.

Within the lower portion or the bottom edge of the partition 9 is a suitable opening *x*. This nose bag is made of some flexible material, such as canvas, leather or the like and in order to properly hold the intermediate partition 9 while the bag is in use, I employ a rectangular frame preferably made of wire comprising the side portions 16, the top portion 17, the sides 16 being bent inwardly to form the securing ears 19, which end proximal to the opening *x*. By reason of this arrangement of the wire and partition the upper part of the partition is held substantially rigid while the lower part is sufficiently flexible to permit the ends of the wires being drawn in as the animal pushes its nose down against the bottom. This causes the partition to work back and forward and acts to more efficiently feed the grain through the opening.

Within the sides 7 of the forward portion of the feed bag are secured suitable ventilators 20 of wire or other suitable gauze, these ventilators extending upward from the bottom 6, as disclosed.

Secured practically midlength to the upper edge of the sides 7 are the supporting straps 21 and 22 connected by means of a suitable buckle 23, as disclosed. Secured to the rear upper edges of the rear sides 10, 10 are the supporting straps 24 and 25 connected by means of a suitable buckle 26, as disclosed.

The operation of my device is very simple, the bag is secured to the horse's head by means of the head straps 21 and 22, positioned immediately to the rear of the horse's ears, as disclosed in Fig. 1, the straps 24 and 25 are then secured to the hames or collar of the harness. In this position of the nose bag the grain which is held in the rear bin-forming receptacle slowly gravitates through the opening *x* into the forward manger-forming receptacle.

From this description and the drawings, it will be seen that the slanting bottom of the rear compartment is higher than the bottom of the forward compartment, and as the nose bag is made of flexible material in its folded condition will form a neat compact package.

If desired the rear magazine-forming receptacle may be provided with a suitable top.

And having thus described my said invention, what I claim as new and desire to secure by U. S. Letters Patent is—

In a device of the kind described, a flexible feed bag, a partition arranged transversely of said bag and having an escape opening formed in its lower edge, and a wire extending across the top, down the sides and inward to the limits of said feed opening.

In testimony whereof, I affix my signature, in presence of two witnesses.

DANIEL C. MARTIN.

Witnesses:
DANIEL M. WILSON.
C. F. BUERMANN.